(12) United States Patent
Hoff

(10) Patent No.: US 8,296,726 B2
(45) Date of Patent: Oct. 23, 2012

(54) REPRESENTATION OF SOFTWARE APPLICATION FUNCTIONALITY

(75) Inventor: Roland Hoff, Walldorf (DE)

(73) Assignee: SAP AG, Walldorf (DE)

(*) Notice: Subject to any disclaimer, the term of this patent is extended or adjusted under 35 U.S.C. 154(b) by 1049 days.

(21) Appl. No.: 12/135,100

(22) Filed: Jun. 6, 2008

(65) Prior Publication Data

US 2009/0307653 A1 Dec. 10, 2009

(51) Int. Cl.
*G06F 9/44* (2006.01)

(52) U.S. Cl. ...................................................... 717/105

(58) Field of Classification Search .................... None
See application file for complete search history.

(56) References Cited

U.S. PATENT DOCUMENTS

| | | | |
|---|---|---|---|
| 5,963,910 A | 10/1999 | Ulwick | |
| 6,871,232 B2 | 3/2005 | Curie et al. | |
| 6,889,222 B1 | 5/2005 | Zhao | |
| 7,117,172 B1 | 10/2006 | Black | |
| 7,139,798 B2 | 11/2006 | Zircher et al. | |
| 7,143,392 B2 * | 11/2006 | Ii et al. | 717/125 |
| 7,366,460 B2 | 4/2008 | O'Farrell et al. | |
| 7,430,410 B2 | 9/2008 | Iwatsu et al. | |
| 7,546,359 B2 | 6/2009 | Tierney et al. | |
| 2002/0052812 A1 | 5/2002 | Braverman | |
| 2002/0055956 A1 | 5/2002 | Krasnoiarov et al. | |
| 2002/0066074 A1 * | 5/2002 | Jabri | 717/105 |
| 2002/0133392 A1 | 9/2002 | Angel et al. | |
| 2002/0152210 A1 | 10/2002 | Johnson et al. | |
| 2002/0156812 A1 | 10/2002 | Krasnoiarov et al. | |
| 2002/0161788 A1 | 10/2002 | Mcdonald | |
| 2003/0004746 A1 * | 1/2003 | Kheirolomoom et al. | 705/1 |
| 2003/0009536 A1 | 1/2003 | Henderson et al. | |
| 2003/0177018 A1 * | 9/2003 | Hughes | 705/1 |
| 2004/0093397 A1 | 5/2004 | Chiroglazov et al. | |
| 2004/0172622 A1 * | 9/2004 | Francis | 717/121 |
| 2004/0215504 A1 | 10/2004 | Ikezawa | |
| 2005/0060371 A1 | 3/2005 | Cohen et al. | |
| 2005/0149908 A1 * | 7/2005 | Klianev | 717/109 |
| 2006/0048093 A1 * | 3/2006 | Jain et al. | 717/104 |
| 2006/0075024 A1 | 4/2006 | Zircher et al. | |
| 2006/0095476 A1 | 5/2006 | Dauer et al. | |
| 2007/0226031 A1 | 9/2007 | Manson et al. | |

(Continued)

FOREIGN PATENT DOCUMENTS

EP 1571541 A2 9/2005

(Continued)

OTHER PUBLICATIONS

European Search Report for European Application No. 07020243.7, mailed on Feb. 20, 2009, 9 pages.

(Continued)

*Primary Examiner* — Wei Zhen
*Assistant Examiner* — Adam R. Banes
(74) *Attorney, Agent, or Firm* — Brake Huges Bellermann LLP

(57) ABSTRACT

A plurality of functional steps corresponding to a functional module of a software application may be determined. Data fields associated with each of the functional steps may be determined. A cardinality associated with each functional step and corresponding to the data fields of the functional step may be determined. A logical sequence of the functional steps including data fields may be determined. A visual representation of the functional module based on the logical sequence may be generated including the functional steps, data fields and cardinality.

17 Claims, 8 Drawing Sheets

U.S. PATENT DOCUMENTS

| | | | |
|---|---|---|---|
| 2007/0226032 A1 | 9/2007 | White et al. | |
| 2008/0082569 A1* | 4/2008 | Mansour et al. | 707/102 |
| 2008/0195429 A1 | 8/2008 | Hoff | |
| 2008/0295071 A1* | 11/2008 | Schellekens | 717/106 |
| 2008/0301645 A1 | 12/2008 | Hoff et al. | |
| 2010/0162214 A1 | 6/2010 | Hoff | |
| 2010/0169844 A1 | 7/2010 | Hoff et al. | |
| 2011/0106549 A1 | 5/2011 | Hoff | |

FOREIGN PATENT DOCUMENTS

| | | |
|---|---|---|
| EP | 1635287 A1 | 3/2006 |

OTHER PUBLICATIONS

European Office Action for European Application No. 07020243.7, mailed on Oct. 16, 2009, 7 pages.

Non-Final Office Action for U.S. Appl. No. 11/590,217, mailed on Jun. 10, 2009, 16 pages.

Final Office Action for U.S. Appl. No. 11/590,217, mailed Jan. 7, 2010, 22 pages.

Office Action Response for U.S. Appl. No. 11/590,217, filed on May 4, 2010, 12 pages.

Non-Final Office Action for U.S. Appl. No. 11/590,217, mailed on Sep. 11, 2009, 18 pages.

U.S. Appl. No. 12/609,750, filed on Oct. 30, 2009, 49 pages.

Non-Final Office Action for U.S. Appl. No. 11/820,701, mailed Apr. 17, 2012, 24 pages.

U.S. Appl. No. 12/343,163, filed on Dec. 23, 2008, 26 pages.

Non-Final Office Action for U.S. Appl. No. 11/820,701, mailed on Aug. 19, 2010, 15 pages.

Non-Final Office Action Response for U.S. Appl. No. 11/820,701, filed Sep. 13, 2011, 10 pages.

Final Office Action for U.S. Appl. No. 11/820,701, mailed Feb. 18, 2011, 18 pages.

Non-Final Office Action for U.S. Application No. 11/820,701, mailed Aug. 19, 2010, 15 pages.

Non-Final Office Action for U.S. Application No. 11/820,701, mailed Jun. 13, 2011, 10 pages.

* cited by examiner

FIG. 6A 600

Result View

Business Document ID 5000123, Item 20 → IncompletenessCheck

(1) Determination of Incompleteness Procedure

602 Step Item Category = ZSFS (Sell From Stock) → Incompleteness Group Transaction = ZSLS
(Incompl. Sales)

604 Step Businesspartner = Johnson → Incompl. Group Business Partner = ZACC
(Incompl. Account Assignment)

606 Step Incompl. Group Transaction = ZSLS
+
Incompl. Group Bus. Partner = ZACC
→ Incompleteness Procedure ⟶ ZSAC   614 Unexpected Result
(Incompl. Sales with Account Assignment)

→ Incompleteness Procedure ZSAC (Incompl. Sales with Account Assignment)

(2) Definition of Incompleteness Procedure

608 Step

First Field 610

Area = Sales Data
Field = Payment Condition
Relevance = Header and Item
Message Category = Error
Business Transaction = INC1 (Set Incompleteness)

Second Field 612

Area = Account AssignmentData
Field = Internal Order Number
Relevance = Header and Item
Message Category = Error
Business Transaction = INC1 (Set Incompleteness)

700

REPRESENTATION OF SOFTWARE APPLICATION FUNCTIONALITY

TECHNICAL FIELD

This description relates to the representation of one or more functionalities of a software application.

BACKGROUND

Standard business software may be written or developed such that it is generic enough to cover the needs of many different companies without further software development. Such a design of standard business software may allow it to present a lower total cost of ownership (TCO) when compared to specially commissioned or designed software packages that may have been specially tailored to meet the needs of a specific business enterprise.

However to ensure the same flexibility as the more individualized business software packages, the standard business software may allow for a large amount of standard settings to be customized to suit the needs of various end users. These customizable settings may determine, control and/or otherwise influence the processes and functionalities of the standard business software.

Certain standard business software packages may involve a large amount of customization such that the customization may be the subject of an entire implementation project (that may be executed by each end user or company of the standard business software). The implementation project may however involve considerable cost, thus increasing the TCO of the standard business software.

Simplifying the customization process of the standard business software may play a key role in reducing the TCO. For example, throughout the life of an implementation project, consultants or developers (commissioned to implement the customizations) may come and go from the project, whereby each new consultant may need to understand the existing logical flow of the standard business software, including any customizations that have already been made, in order to help implement further customizations.

Additionally, the more the standard business software is customized, the greater the likelihood that the customizations may result in unexpected output when executed by the software application. For example, an application with 100 customized steps may have a greater likelihood of generating unexpected output versus an application with only 10 customized steps. More customizations may also result in a greater number of customized steps that a developer or consultant needs to parse through to determine the source of the unexpected output. At which point it may be difficult and time-intensive for the consultant to try and determine precisely which customization step was responsible for producing the unexpected output, especially in the case of a large number of customization steps.

SUMMARY

According to an example embodiment, a system is provided. A software handler may receive a selected functional module from one or more functional modules of a software application. A step engine may determine two or more functional steps associated with the selected functional module. A sequencer may determine a logical sequence associated with the two or more functional steps. A field engine may determine at least one of an input data field or output data field associated with each of the functional steps. A view generator may generate a visual representation of the selected functional module including the logical sequence associated with the two or more functional steps and the at least one of input data field or output data field associated with each of the functional steps.

According to an example embodiment, a method is provided. A plurality of functional steps corresponding to a functional module of a software application may be determined, the functional module being associated with one or more business objects. Data fields associated with each of the functional steps may be determined, the data fields including input data fields and output data fields. It may be determined which of the data fields correspond to the one or more business objects. A cardinality associated with each functional step may be determined, the cardinality corresponding to the data fields of the functional step. A logical sequence of the functional steps may be determined, the logical sequence including the input data fields and output data fields. A visual representation of the functional module may be generated based on the logical sequence, the visual representation including functional steps, data fields and cardinality.

According to an example embodiment, an interface displaying a visual representation of a functional module of a software application is provided, the functional module including a plurality of functional steps and customization settings. Step icons may represent each of the functional steps, including a first step icon representing a first functional step and a second step icon representing a second functional step. A field icon may represent each of one or more data fields associated with the functional steps, including input data fields and output data fields. One or more links may be provided, the one or more links may be associated with the customization settings. Connectors between the step icons may indicate a logical sequence of the functional steps, including a first connector between the first step icon and the second step icon indicating the first functional step precedes the second functional step.

DETAILED DESCRIPTION

Figure 1:
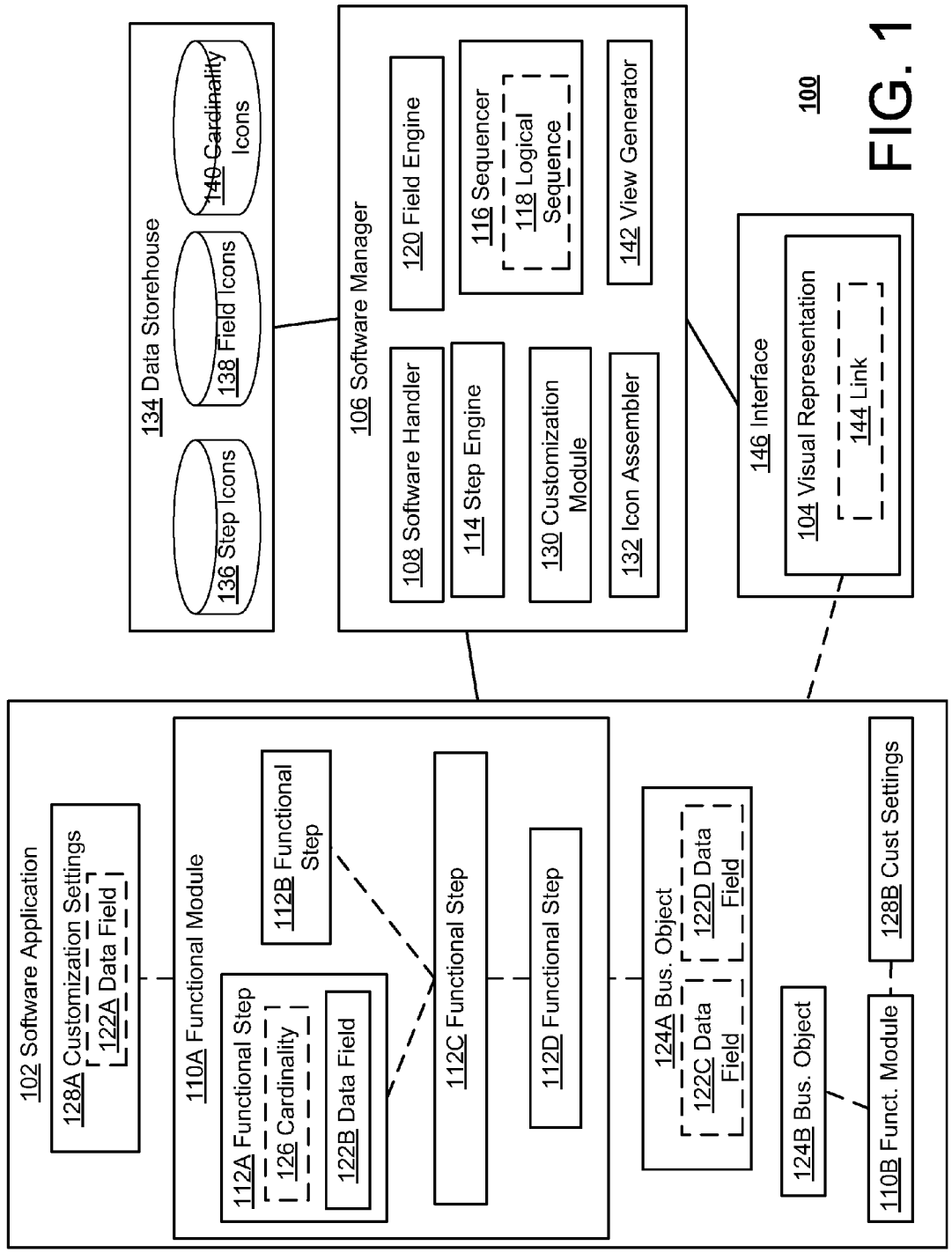
FIG. 1 is a block diagram of an example system for displaying a representation of one or more functionalities of a software application, according to an example embodiment.

FIG. 1 is a block diagram of an example system 100 for displaying a representation of one or more functionalities of a software application, according to an example embodiment. In the example of FIG. 1, the system 100 allows for planned and/or actual functionalities of a software application 102 to be visually represented, including customizations made therewith. The system 100 may, for example, generate a visual representation 104 of a portion of the software application 102, the visual representation 104 including iconic representations of the code, underlying structure, data, computations algorithm and/or other components of the software application 102. Based on the visual representation 104, a user may quickly determine what functionalities the software application 102 is performing and/or how those functionalities are being performed. The user may then, for example, be able to more quickly learn about the existing software application 102 and continue developments, maintenance, modifications and/or customizations therewith.

The software application 102 may include an application, a program, code, an applet and/or other module that designed to perform and/or execute one or more functions. For example, the software application 102 may include a customer relationship management (CRM) application, supply chain management (SCM) application or enterprise resource planning (ERP) application.

The software application 102 may perform one or more tasks that may be customized or otherwise modified to suit a user's needs. For example, the software application 102 may include a shell program for generating customer reports for a company. Then for example, the software application 102 may be customized to generate the reports about the customers based on the company's specific reporting techniques and/or the location of data from the company's systems to be used by the software application 102. Other example features of the software application 102 that may be customized include calculating, retrieving, storing data and/or processing other documents or information as may be specified. In other example embodiments, the software application 102 may include an application under development where one or more of the functionalities may not be working as intended.

The visual representation 104 may include one or more graphical depictions of the software application 102, including portions thereof. For example, the visual representation 104 may include graphical, iconic, textual and/or other representations of the functionalities the software application 102 is designed to perform. In other example embodiments, the visual representation 104 may include audio components as well. The visual representation 104 may differentiate various components of the software application 102 by way of any combination of visual attributes including, for example, shape, color, size, text and numbering. Then for example, the visual representation 104 may be used to quickly determine what functionalities the software application 102 currently performs and/or is designed to perform, including the components involved in performing those functionalities and how those components interact with one another.

A software manager 106 that may provide the visual representation 104 of the software application 102. The software manager 106 may determine the functionalities performed by the software application 102, the components performing those functionalities, any customizations that may have been made, the order and/or sequence of interactions amongst the components including data input and/or output by each component and provide that information via the visual representation 104. According to an example embodiment, the visual representation 104 may include planned and/or future developments to the software application 102.

A software handler 108 may determine the functionalities performed by the software application 102. For example, the software application 102 may include one or more functional modules 110A and 110B, each functional module 110A, B being designed or configured perform one or more functionalities. Then for example, the software handler 108 may identify the various functional modules 110A, B of the software application 102. According to an example embodiment, the software handler 108 may receive a selection of one or more of the functional modules 110A and 110B for which the visual representation 104 may be rendered.

The functional modules 110A, B may include a portion, subset, program, algorithm, applet or other function performed by the software application 102. The functional modules 110A, B may include or represent one or more functional areas of the software application 102. The functional modules 110A, B may, for example, perform one or more tasks associated with the operation of the software application 102. For example, in a CRM system, the functional modules 110A, B may include accounting, taxes, sales, lead generation, payroll, inventory, distribution or other functionalities.

Each functional module 110A, B may include one or more functional steps 112A-D. The functional steps 112A-D may include steps performed within or otherwise associated with the functional modules 110A and B. The functional steps 112A-D may include for example data reads, data write, data calculation, data manipulation or other steps that may be performed. For example, the functional steps 112A and 112B may read information from a data source, provide this information to the functional step 112C for processing, which may provide the processed information to the functional step 112D where it may be output or stored. According to an example embodiment, the functional steps 112A-D may include customizations made to the software application 102 (e.g., customizing settings 128A, 128B).

A step engine 114 may determine the functional steps 106A-D of the functional modules 110A, B. The step engine 114 may, for example, parse or otherwise determine the functional steps 112A-D of the functional modules(s) 110A, B. According to an example embodiment, the step engine 114 may determine the functional steps 112A-D for a selected functional module 110A for which the software manager 106 may generate the visual representation 104.

A sequencer 116 may determine a logical sequence 118 of the functional steps 112A-D. The sequencer 116 may determine, for example, which, if any, of the functional steps 112A-B may be performed in parallel, which are performed sequentially and the data flow within the functional modules 110A, B. For example, in FIG. 1, the sequencer 116 may determine that functional steps 112A and 112B may be performed in parallel, both of which provide inputs to functional step 112C, which is performed prior to functional step 112D. Then for example, the sequencer 116 may store this information as or in the logical sequence 118. Thus, the logical sequence 118 may include a sequence or other ordering of the functional modules 110A, 110B as determined by the sequencer 116 as just discussed.

A field engine 120 may determine the data flow amongst the functional steps 112A-D. The field engine 120 may for example determine which data fields 122A-D correspond to which functional steps 112A-D, which are input and which are output. The field engine 120 may further determine the source and/or destination of the data fields 122A-D and the information may be passed via the data fields 122A-D within the software application 102.

The data fields 122A-D may include information input to, computed within and/or output by the functional modules 110A, B. The functional modules 110A, 110B may receive, process and output information via the data fields 122A-D. For example, data field 122A may be received by functional step 112A, whereby data field 122A may include the name of a business partner "Dr. John S. Smith, MD". Then for example functional step 112A may process the business partner name by removing any titles and provide the processed name "John S. Smith" via data field 122B to functional step 112C. Functional step 112C may remove the middle initial and pass the name "John Smith" to functional step 112D. Functional step 112D may then capitalize each letter and pass "JOHN SMITH" to a business object 124A via data field 122D.

Business objects 124A, B may include data sources and/or data repositories for the software application 102. For example, the business objects 124A, B may include business documents associated with sales orders, quotations, sales leads, opportunities, contracts, product data, business partner data or other business documents. The business objects 124A, B may be associated with the functional modules 110A, 104B. Then for example, information from the business objects 124A, B may be used in the functional modules 110A, B (including the functional steps 112A-D), and/or information from the functional modules 110A, B may be output to the business objects 124A, B. Though shown as part of the software application 102 in the example of FIG. 1, the business objects 124A, B may be items outside of the software application 102, such as from different systems or received over a network.

As referenced above, the field engine 120 may determine the data flow amongst the functional modules 110A, B of the software application 102. This data flow may include determining the flow of information via the data fields 122A-B, including information to/from other components associated with the software application 102 such as the business objects 124A, B. The data flow as determined by the field engine 120 may also become part of or may otherwise be included with the logical sequence 118. In an example embodiment, the data flow may include the specific values passed within the software application 102 via the data fields 122A-D.

According to an example embodiment, the field engine 126 may determine a cardinality 126 associated with the functional steps 112A-D. The cardinality 126 may include an indication of the input(s) and/or output(s) of data (e.g., data fields 122A-D) for the functional steps 112A-D. For example, a cardinality of 3:1 may indicate that there may be 3 inputs into a functional step 122A-D and 1 output from it. In other example embodiments, the cardinality 126 may include a variable, such as "n" indicating any number of inputs and/or outputs may be provided. The field engine 120 may determine the cardinality 126 for each of the functional steps 112A-D and store this information with the logical sequence 118.

As referenced above, the software application 102 may be customized to suit one or more user's needs by way of one or more customization settings 128A, B. The customization settings 128A, B may include settings and/or features of the software application 102, including the functional modules 110A, 110B, that may be customized to suit the needs or preferences of one or more users. According to an example embodiment, the customization settings 128A, B may include information provided that does not change any underlying software code of the software application 102. The customization settings 128A, B may include for example, the location of data to be input and/or output by the software application 102, values used within the functional steps 112A-D or other settings. For example the data field 122A may include data input to and/or output from the functional module 110A. Or for example, the customization settings 128A, B may directly or indirectly influence which functionalities are performed by the software application 102.

A customization module 130 may determine the customization settings 128A, B. For example, the customization module 130 may determine which customization settings 128A, B are associated with which functional modules 110A, B and/or which functional steps 112A-D. The customization module 130 may, for example, the values of the customization settings 128A, B used to customize the software application 102. In an example embodiment, the customization settings 128A, B may be included in the logical sequence 118.

An icon assembler 132 may be configured to determine icons corresponding to or otherwise representing the portions of the software application 102. For example, the icon assembler 132 may determine from a data storehouse 134, step icons 136 to represent functional steps 112A-D, field icons 138 to represent the data fields 122A-D, and cardinality icons 140 to represent the cardinality 126 in the visual representation 104. The icon assembler 132 may determine which icons to represent the various data fields 122A-D based on a classification or other usage of the data fields 122A-D. For example, the data fields 122A-D may appear as different colors within the visual representation 104 based on a determination as to whether they are input to the functional module 110A, output by the functional module 110A or used in processing within the functional module 110A but neither directly input from nor output to a source outside the functional module 110A.

The icons (e.g., step icons 136, field icons 138 and cardinality icons 140, hereinafter collectively referred to as "icons") may each be associated with one or more visual attributes. The visual attributes may include color, shape, size, texture and/or any other attribute that may differentiate the icons in the visual representation 104. In an example embodiment, the attributes may include any variances in the appearances of the icons within the visual representation 104. For example, each of the step icons 136 may be associated with a different shape, each of the field icons 138 may be associated with a different color, and each of the cardinality icons 140 may be associated with a different size.

A view generator 142 may generate the visual representation 104. The view generator 142 may arrange the icons as determined by the icon assembler 132 in the visual representation 104 to represent the functional modules 104A, B of the software application 102 based on the logical sequence 118. Then for example, by viewing the visual representation 104, a user may be able to easily determine the logical order of the functional steps 112A-D, the cardinality 126 of the functional steps, data fields 122A-D passed amongst the functional steps 112A-D, business objects 124A, B involved and which customization settings 128A, B have been applied or made to the software application 102. The visual representation 104 may also allow a user to more easily plan for potential or future customizations or modifications to the software application 102, including the maintenance of the customizing settings 128A, 128B, thereof.

The visual representation 104 may include one or more links 144. The link 144 may include a hyperlink, pointer or other link to the program code or customization table corresponding to one or more of the icons or other features from the visual representation 104. For example, a user or developer may view the visual representation 104 and may select a field icon 138 from the visual representation 104. Then for example, the field icon 138 may be associated with the link 144, and upon selection of the field icon 138 the user or developer may be directed to a table or other memory location where the corresponding to the data field 122A-D associated with the selected field icon 138 wherein it may be modified. This may allow for example quicker and easier modification to one or more sections of the software application 102, including the customization settings 128A, B. Then for example, the view generator 142 may update the visual representation 104 based on whatever, if any, modification that has been made.

The visual representation 104 may appear or otherwise be provided via an interface 144. The interface 144 may include a visual or graphical user interface (GUI) whereby the icons (e.g., 136, 138 and 140) may be displayed in conjunction with other visual elements. For example, the interface 144 may display the icons with connectors such as arrows in between the icons to depict the flow of processing (which may be included in the visual representation 104) as determined in the logical sequence 118. Then for example, the interface 144 may display the program code or other settings responsive to a selection of the link 144 as discussed above.

It may be the case that the software application 102 may include a program being developed, modified or otherwise customized by multiple engineers and/or programmers. During the course of development engineers enter and leave the project and the new engineers may need to get up to speed on what developments and/or customizations have occurred with respect to the software application 102. In traditional systems, teaching new engineers what developments have been made to the software application 102 may require reading through hundreds or thousands of lines of code amongst various files or systems, which may require may hours. During which time additional developments may be made which would require further study by the engineers. The process could become very time intensive, especially for larger projects with large numbers of engineers rotating on and off the development.

The visual representation 104 may allow a user, developer or programmer of the system 100 to quickly learn about not only which customizations or developments have been made to the software application 102, but also how those customizations are implemented. The visual representation 104 may allow for efficient system development and/or easy verification of results of a customized software application 102. For example, the visual representation 104 may allow a developer to more quickly identify which customization settings 128A, B are associated with an error or unexpected result are to be corrected and/or where an improvement is to be made. By having a uniform way of representing potential and/or actual customizations to the software application 102, system designers, programmers and/or other users may quickly determine when a particular aspect (e.g., functional module 104A, B) of the software application 102 has been customized and how the customizations have been implemented. The uniform representation may also allow for future/planned customizations to be modeled before and/or after implementation or integration with the software application 102.

Figure 2:
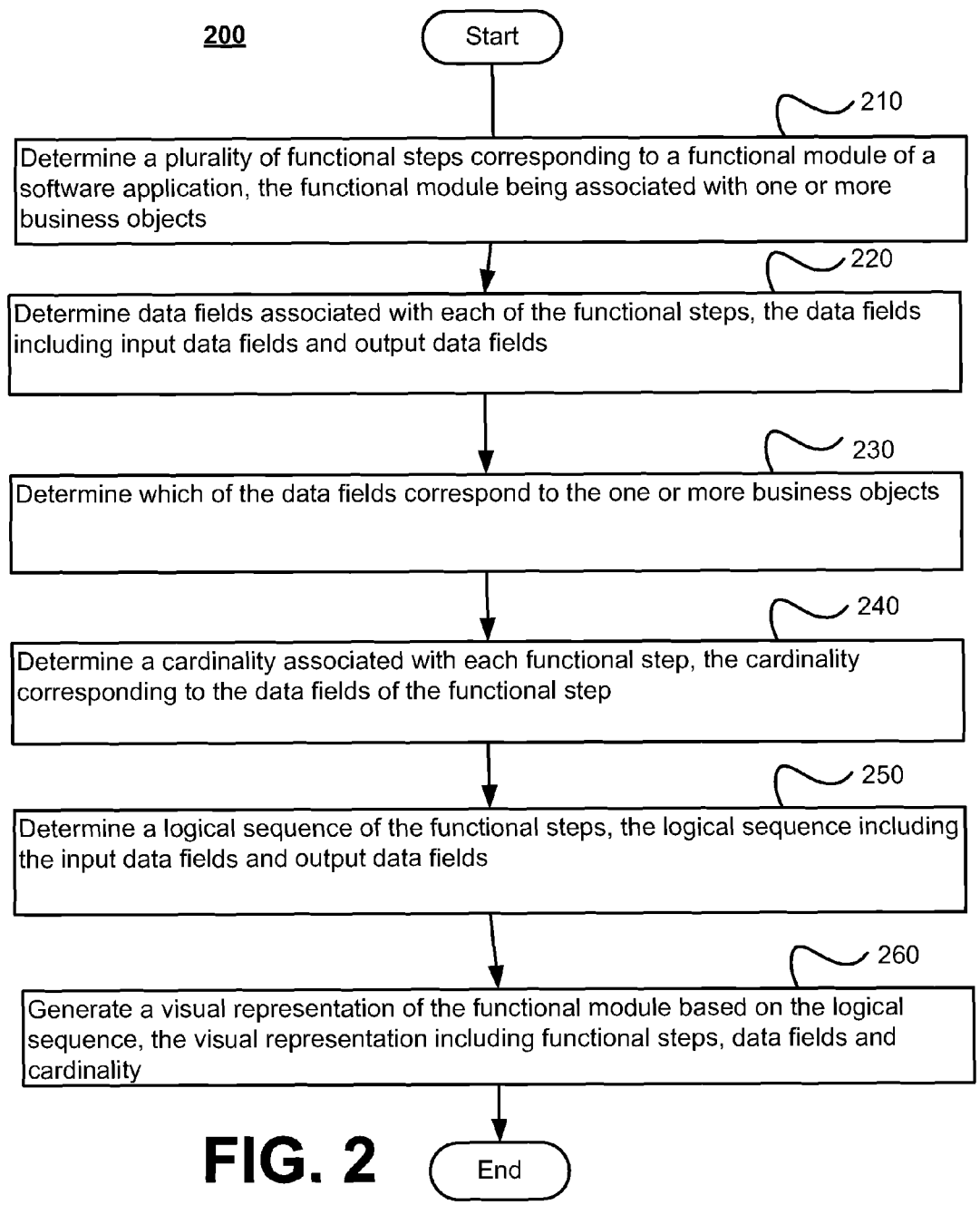
FIG. 2 is a flowchart illustrating example operations of the system of FIG. 1.

FIG. 2 is a flowchart 200 illustrating example operations of the system of FIG. 1. More specifically, FIG. 2 illustrates an operational flow 200 representing example operations related to application modification representation.

After a start operation, a plurality of functional steps corresponding to a functional module of a software application may be determined, the functional module being associated with one or more business objects (210). For example, the step engine 114 may determine the functional steps 112A-D corresponding to the functional module 110A of the software application 102, the functional module 110A being associated with the business object 124A.

Data fields associated with each of the functional steps may be determined, the data fields including input data fields and output data fields (220). For example, the field engine 120 may determine the data fields 122A-D associated with each of the functional steps 112A-D. The data fields 122A-D may include input data fields such as data field 122A that may be input to the functional module 110A and output data fields such as data field 122D that may be output from the functional module 110A.

It may be determined which of the data fields correspond to the one or more business objects (230). For example, the field engine 120 may determine that the data fields 122C and 122D correspond to each of the business object 124A.

A cardinality associated with each functional step may be determined, the cardinality corresponding to the data fields of the functional step (240). For example, the field engine 120 may determine the cardinality 126 associated with each of the functional steps 112A-D, the cardinality 126 corresponding to the data fields 122A-D of the functional steps 112A-D.

A logical sequence of the functional steps may be determined, the logical sequence including the input data fields and output data fields (250). For example, the sequencer 116 may determine the logical sequence 118 of the functional steps 112A-D, including the data fields 122A-D.

A visual representation of the functional module may be generated based on the logical sequence, the visual representation including functional steps, data fields and cardinality (260). For example, the view generator 142 may generate the visual representation 104 based on the logical sequence 118, the visual representation 104 including steps icons 136, field icons 138 and cardinality icons 140 representing the functional steps 112A-D, data fields 122A-D and cardinality 126, respectively.

Figure 3:
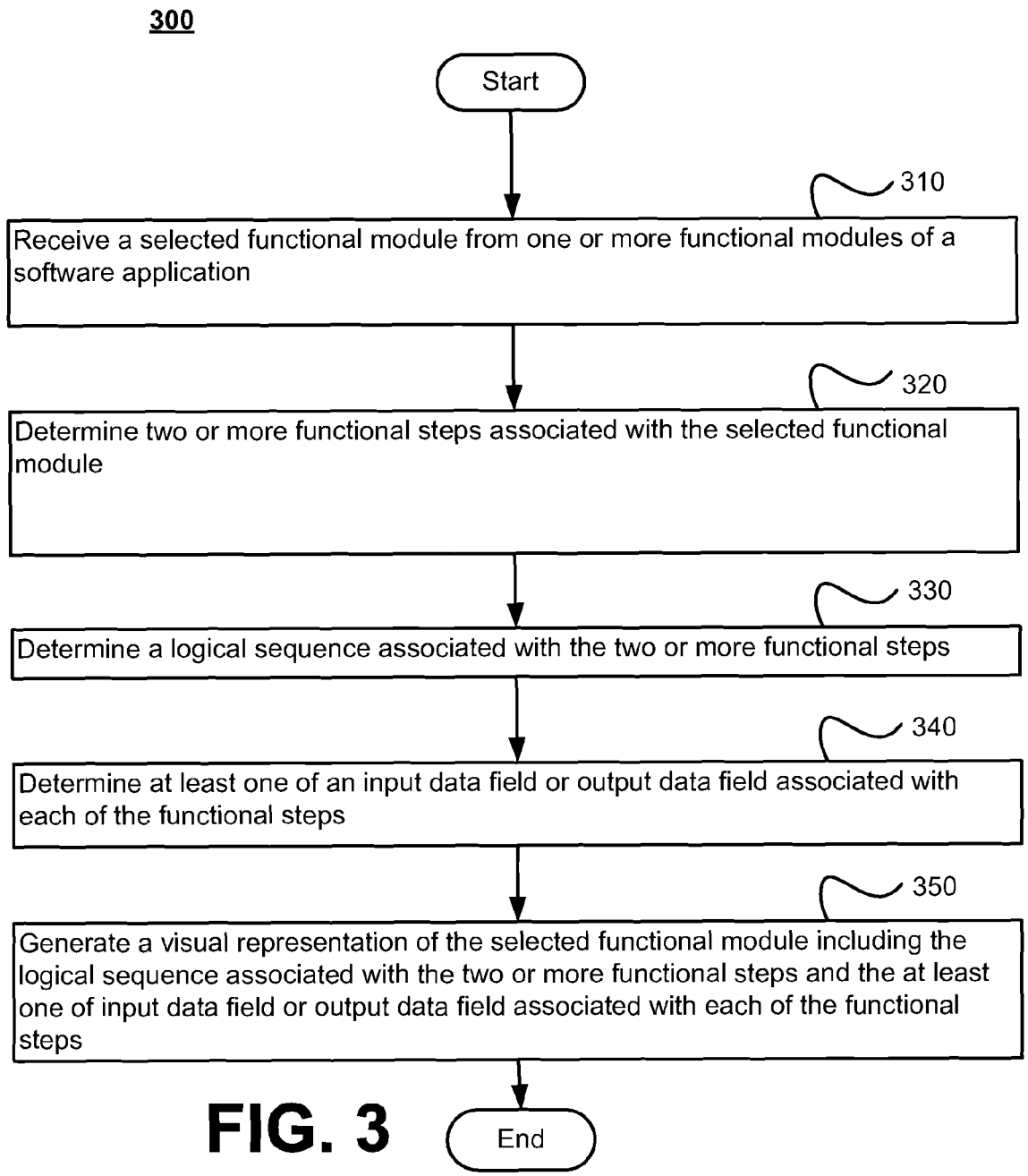
FIG. 3 is a flowchart illustrating example operations of the system of FIG. 1.

FIG. 3 is a flowchart 300 illustrating example operations of the system of FIG. 1. More specifically, FIG. 3 illustrates an operational flow 300 representing example operations related to application modification representation.

After a start operation, a selected functional module may be received from one or more functional modules of a software application (310). For example, the software handler 108 may receive a selection of the functional module 110A from the functional modules 110A, 110B of the software application 102.

Two or more functional steps associated with the selected functional module may be determined (320). For example, the step engine may determine the functional steps 112A-D associated with the selected functional module 110A.

A logical sequence associated with the two or more functional steps may be determined (330). For example, the sequencer 116 may determine the logical sequence 118 associated with the functional steps 112A-D.

At least one of an input data field or output data field associated with each of the functional steps may be determined (340). For example, the field engine 120 may determine the data fields 122A-D, which may include input and output fields, for the functional steps 112A-D. Though not specifically shown in FIG. 1, additional data fields 122A-D may be present in the software application 102.

A visual representation of the selected functional module including the logical sequence associated with the two or more functional steps and the at least one of input data field or output data field associated with each of the functional steps may be generated (350). For example, the view generator 142 may generate the visual representation 104 of the selected functional module 110A based on the logical sequence 118, and including the step icons 136 and field icons 138 representing the functional steps 112A-D and data fields 122A-D, respectively.

Figure 4:
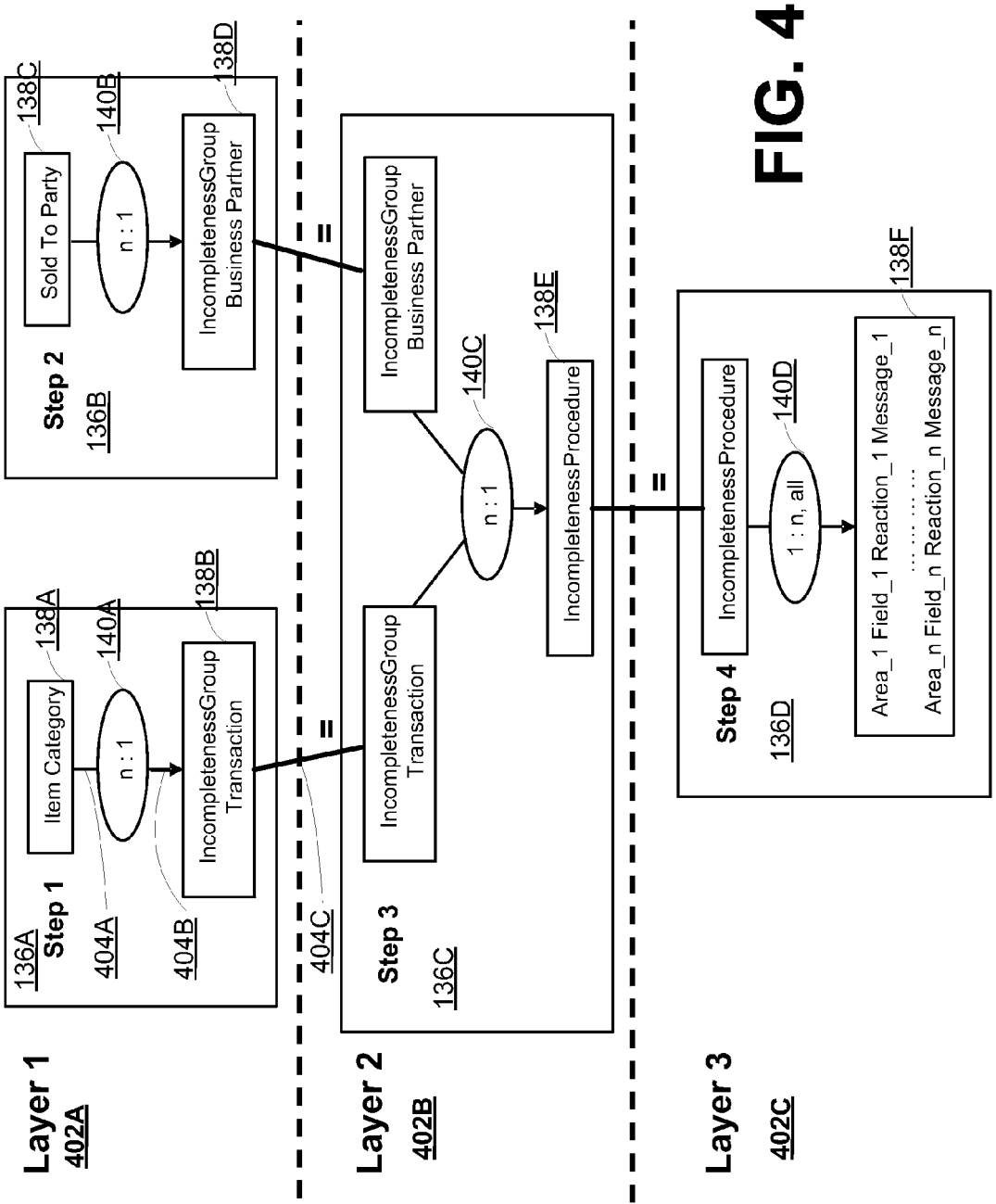
FIG. 4 is a block diagram of an example visual representation of a functional module, according to an example embodiment.

FIG. 4 is a block diagram of an example visual representation 400 of a functional module 110A, according to an example embodiment. In the example of FIG. 4, the visual representation 400 may include an example visual representation 104 (of FIG. 1).

The visual representation 400 may include step icons 136A-D representing functional steps 1-4, respectively. Within each functional step is shown field icons 138A-F and corresponding cardinality icons 140A-D, representing data fields and cardinalities associated with functional steps 1-4, respectively. For example, the cardinality of Step 1 is n:1, indicating 'n' data fields may be input and 1 data field will be output. Then for example, as shown, only 1 data field "item category" is input and only 1 data field "Incompleteness-Group Transaction" is output from Step 1.

As referenced above, the field icons 138A-F, as shown in the visual representation 400 may vary in appearance based on a classification of the usage(s) of the underlying data fields. For example, input data field icons (e.g., 138A, 138C), e.g., fields input into the functional step may appear as the color blue, intermediary field icons (e.g., 138B, 138D and 138E), e.g., fields neither input from or output to another source but only used within the context of the functional step, may appear as the color green and output data field icons (e.g., 138F), e.g., fields that are output from a functional step, may appear yellow in the visual representation 400.

The visual representation 400 may include layers 402A, 402B and 402C. The layers 402A-C may include one or more functional steps that may be performed in parallel and/or are independent of one another. For example, in layer 1402A, the step 1 and step 2 may be performed in parallel and may be independent of one another. However, layer 2 and layer 3 may each only include a single functional step (step 3 and step 4, respectively). This, for example, may indicate a sequencing (e.g., logical sequence 118) of the underlying functional steps whereby the functional step 4 may be dependent on the processing done within the functional step 3.

Connectors 404A, 404B and 404C may also be included in the visual representation 400. The connectors 404A-C may indicate a flow of data and/or processing between the elements of a functional module. The connectors may indicate inputs, outputs, equivalencies and/or other relationships, flow or ordering. For example, the connector 404A may indicate that data field "item category" is being input to "step 1" as it relates to cardinality "n:1". Then for example, the connector 404B may indicate that "incompletenessgroup transaction" is being output from "step 1". The connector 404C may indicate equivalence between the "incompletenessgroup transaction" as shown in step 1 and the "incompletenessgroup transaction" as shown in step 3. In other example embodiments, other connectors 404A-C may be used and/or displayed.

According to an example embodiment, the connectors 404A-C may indicate a logical sequence of the functional steps 136A-D. For example, the logical sequence may be that functional step 136A is a prerequisite to functional step 136C, in that the functional step 136A is to be performed prior to performing the functional step 136C. Similarly, the functional step 136B may be a prerequisite to the functional step 136C. Then for example, the functional steps 136A, 136B and 136C may all be prerequisites to performing the functional step 136D.

Figure 5:
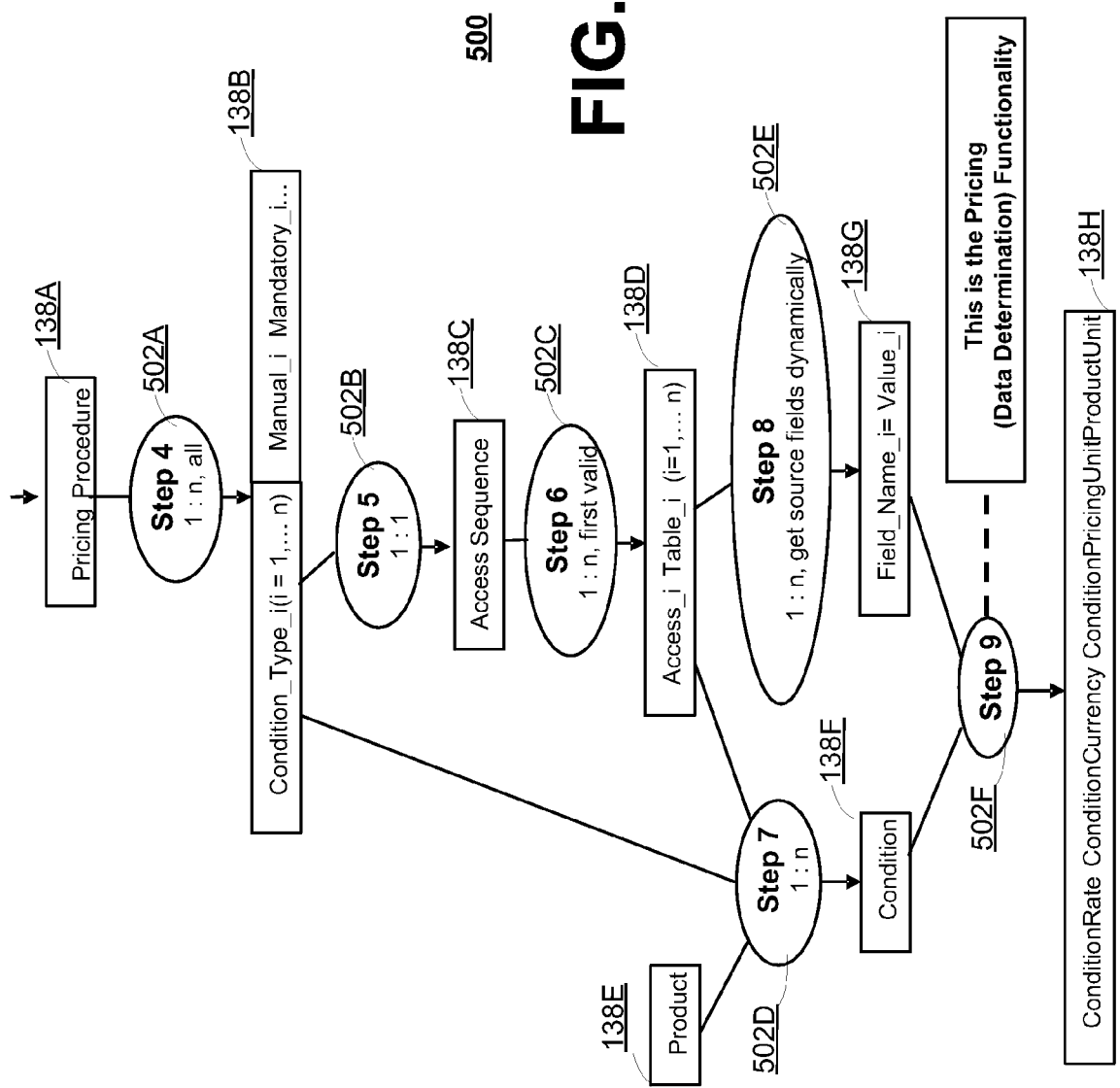
FIG. 5 is a block diagram of an example visual representation of a software application, according to an example embodiment.

FIG. 5 is a block diagram of an example visual representation 500 of a software application 102, according to an example embodiment. The visual representation 500 may include input, output and intermediary data fields as represented by field icons 138A-H.

The visual representation may also include step bubbles 502A-F. The step bubbles 502A-F may include iconic representations of a functional step with their corresponding cardinalities. For example, the step bubbles 502A-F may represent functional steps 4-9 and corresponding cardinalities (e.g., 126).

In the example of FIG. 5, step bubble 502A may receive the pricing procedure (138A) from another source, such as a functional module or previous step. Then for example, step bubble 502A may output data fields 138B and 138C. Data field 138B and 138C may then be provided to Step 7 (502D) which may also receive data fields 138G and 138E. Meanwhile, data fields 138B and 138C may also be provided to step 5 (502B).

Figure 6:
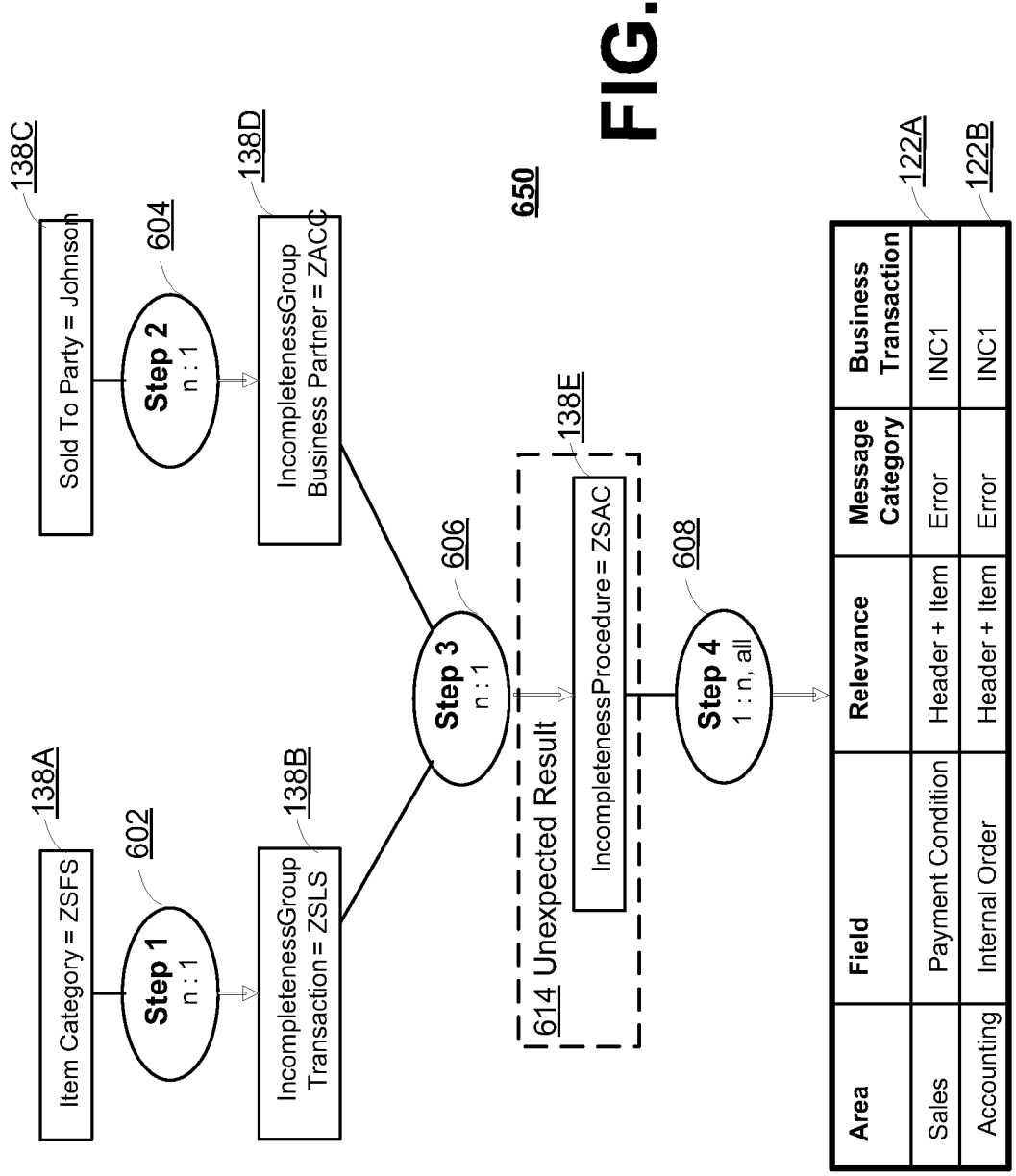
FIG. 6A is a block diagram of an example result view, according to an example embodiment.
FIG. 6B is a block diagram of an example visual representation of the result view of FIG. 6A, according to an example embodiment.

FIG. 6A is a block diagram of an example result view 600, according to an example embodiment. The result view 600 may include a depiction of one or more modifications or customizations made to the functional steps 602-608 of a software application 102. The result view 600 may include a first and second customization settings 610 and 612, respectively. The result view 600 may also include an unexpected result in data field 614, as shown. The unexpected result field 614 may include an erroneous or otherwise unexpected result that may occur from implementing one or more modifications. The result view 600 may be output as a result of processing done by an existing system.

FIG. 6B is a block diagram of an example visual representation 650 of the result view 600 of FIG. 6A, according to an example embodiment. The customization fields and functional steps of FIG. 6A, discussed above, may appear in the visual representation 650 of FIG. 6B with like numbering. For example, the step 602 of FIG. 6A may appear as step bubble 602 in FIG. 6B. Also the visual representation 650 of FIG. 6B may allow a user to more easily and quickly determine a logical ordering of the steps 602, 604, 606 and 608 in the visual representation 650 versus the result view 600 of FIG. 6A.

Figure 7:
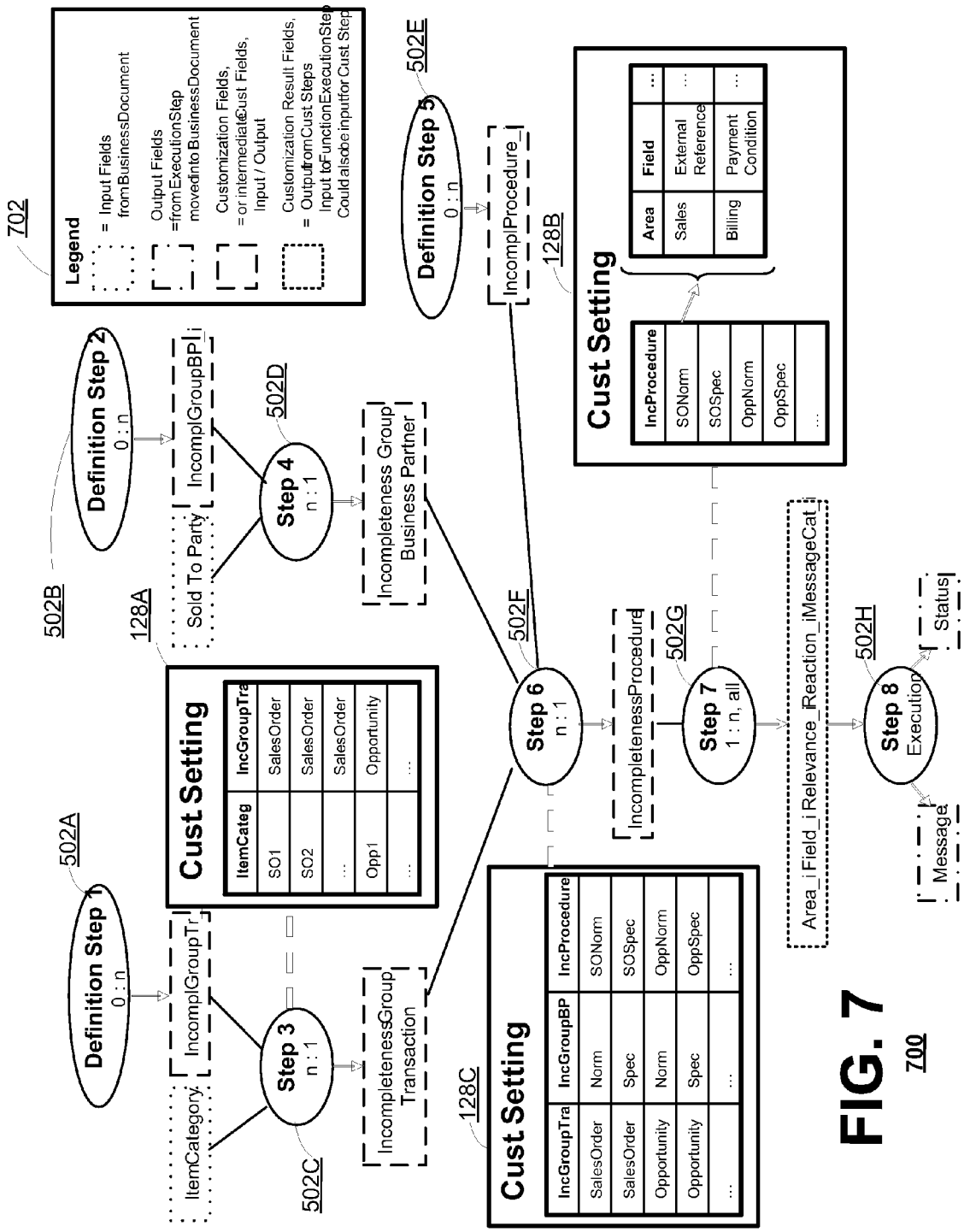
FIG. 7 is a block diagram of an example visual representation, according to an example embodiment.

FIG. 7 is a block diagram of an example visual representation 700, according to an example embodiment. The visual representation 700, may include a legend 702 may include a legend or map explaining variances in the items displayed on the visual representation 104. For example, the legend 702 may differentiate various data fields (e.g., data field icons) by color based on the usage of the underlying data fields (e.g., input, output, intermediate and result).

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
   at least one processor;
   non-transitory computer-readable storage medium including instructions executable by the at least one processor, the instructions configured to implement;
   a software handler configured to receive a selected functional module from one or more functional modules of a software application;
   a step engine configured to determine two or more functional steps associated with the selected functional module, the step engine being configured to determine a cardinality associated with each functional step, the cardinality indicating a ratio between input data fields and output data fields;
   a sequencer configured to determine a logical sequence associated with the two or more functional steps;
   a field engine configured to determine at least one data field associated with each of the functional steps, the at least one data field including at least one of an input data field and an output data field;
   an icon assembler configured to determine a step icon for each of the two or more functional steps, a field icon for each data field associated with each of the functional steps and a cardinality icon representing the cardinality for each functional step; and
   a view generator configured to generate a visual representation of the selected functional module, the visual representation providing an arrangement of the step icons, the field icons, the cardinality icons and at least one connector indicating the logical sequence associated with the two or more functional steps,
   the visual representation providing a link associated with customization settings, the customization settings corresponding to at least one of the data fields, the link configured to cause display of the customization settings upon selection of a respective field icon associated with the link.

2. The system of claim 1 wherein the software handler is configured to determine one or more business objects associated with the selected functional module.

3. The system of claim 2 wherein the field engine is configured to determine that one of the input data field and output data field is associated with the one or more business objects.

4. The system of claim 3 wherein the view generator is configured to generate the visual representation, including the association between the one or more business objects and the input data field or output data field.

5. The system of claim 1 wherein:
   the step engine is configured to determine the two or more functional steps, including a first functional step and a second functional step; and
   the sequencer is configured to determine that the first functional step precedes the second functional step.

6. The system of claim 1 wherein:
   the step engine is configured to determine the two or more functional steps, including a first functional step and a second functional step; and
   the sequencer is configured to determine that the first functional step and second functional step operate in parallel.

7. The system of claim 1 further comprising a customization module configured to determine the customization settings associated with the functional steps.

8. A computer-implemented method performed by at least one processor, the method comprising:
   determining, by the at least one processor, a plurality of functional steps corresponding to a functional module of a software application, the functional module being associated with one or more business objects;

determining, by the at least one processor, data fields associated with each of the functional steps, the data fields including input data fields and output data fields;

determining, by the at least one processor, which of the data fields correspond to the one or more business objects;

determining, by the at least one processor, a cardinality associated with each functional step, the cardinality indicating a ratio between input data fields and output data fields;

determining, by the at least one processor, a logical sequence of the functional steps, the logical sequence including the input data fields and output data fields;

determining, by the at least one processor, a step icon for each of the plurality of functional steps, a field icon for each data field associated with each of the functional steps, and a cardinality icon representing the cardinality for each functional step;

generating, by the at least one processor, a visual representation of the functional module, the visual representation providing an arrangement of the step icons, the field icons, the cardinality icons, and connectors indicating the logical sequence of the functional steps, the visual representation providing a link associated with customization settings, the customization settings corresponding to at least one of the data fields; and displaying, by the at least one processor, the customization settings upon selection of a respective field icon associated with the link.

9. The method of claim 8 further comprising determining the customization settings associated with the functional steps.

10. The method of claim 9 wherein the generating comprises generating the visual representation including the customization settings.

11. The method of claim 8 wherein the determining a logical sequence comprises determining one or more layers associated with the functional steps, wherein each layer includes one or more functional steps configured to be performed in parallel.

12. A data processing apparatus, comprising:
at least one processor;
non-transitory computer-readable storage medium including instructions executable by the at least one processor, the instructions configured to implement;
an interface configured to display a visual representation of a functional module of a software application, the functional module including a plurality of functional steps and customization settings, the visual representation including, step icons representing each of the functional steps, including a first step icon representing a first functional step and a second step icon representing a second functional step;

field icons representing data fields associated with the functional steps, including input data fields and output data fields;

cardinality icons indicating a cardinality associated with the functional steps, the cardinality indicating a ratio between the input data fields and the output data fields;

one or more links associated with the customization settings, the customization setting corresponding to at least one of the data fields;

connectors between the step icons indicating a logical sequence of the functional steps, including a first connector between the first step icon and the second step icon indicating the first functional step precedes the second functional step, wherein the one or more links is configured to cause display of the customization settings upon selection of a respective field icon.

13. The visual representation of claim 12 wherein the interface is configured to receive a modification associated with the customization settings via the one or more links.

14. The system of claim 1, wherein field icons associated with input data fields have a different color than field icons associated with output data fields.

15. The system of claim 1, wherein the visual presentation provides a legend displaying explanation information on differentiating the data fields by color.

16. The system of claim 1, wherein the visual representation provides a secondary link associated with at least one step icon, the secondary link configured to cause display of source code upon selection of a respective step icon associated with the secondary link.

17. The system of claim 1, wherein at least one step icon has a different size than other step icons.

* * * * *